United States Patent
Hsu et al.

(10) Patent No.: US 10,275,636 B2
(45) Date of Patent: Apr. 30, 2019

(54) FINGERPRINT IDENTIFYING MODULE

(71) Applicant: Primax Electronics Ltd., Taipei (TW)

(72) Inventors: Mao-Hsiu Hsu, Taipei (TW); Kuan-Pao Ting, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 109 days.

(21) Appl. No.: 15/483,431

(22) Filed: Apr. 10, 2017

(65) Prior Publication Data
US 2018/0165499 A1    Jun. 14, 2018

(30) Foreign Application Priority Data
Dec. 14, 2016  (TW) ............................. 105141383 A

(51) Int. Cl.
*G06K 9/00*    (2006.01)
(52) U.S. Cl.
CPC ................................ *G06K 9/00053* (2013.01)
(58) Field of Classification Search
CPC ................................................. G06K 9/00053
See application file for complete search history.

(56) References Cited

U.S. PATENT DOCUMENTS

| | | | | |
|---|---|---|---|---|
| 7,771,215 B1* | 8/2010 | Ni | ..................... | G06K 19/07732 439/131 |
| 9,646,905 B2* | 5/2017 | Lin | ..................... | G06K 9/00053 |
| 2007/0292009 A1* | 12/2007 | Nguyen | ................. | G06F 21/32 382/124 |
| 2008/0233798 A1* | 9/2008 | Yu | ........................ | C09D 17/001 439/607.01 |
| 2008/0280490 A1* | 11/2008 | Nguyen | .............. | G06F 12/1416 439/607.01 |
| 2010/0039225 A1* | 2/2010 | Yu | ........................ | C09D 17/001 340/5.83 |
| 2014/0043138 A1* | 2/2014 | Idsoe | ..................... | G06F 21/32 340/5.53 |
| 2015/0334859 A1* | 11/2015 | Lee | ...................... | H05K 5/0247 361/749 |
| 2016/0210496 A1* | 7/2016 | Lin | ..................... | G06K 9/00053 |
| 2017/0098110 A1* | 4/2017 | Kim | ..................... | G06K 9/0002 |
| 2017/0372123 A1* | 12/2017 | Kim | ..................... | G06F 3/0412 |
| 2018/0232982 A1* | 8/2018 | Hsu | ..................... | G07C 9/00563 |

* cited by examiner

*Primary Examiner* — Mia M Thomas
(74) *Attorney, Agent, or Firm* — Muncy, Geissler, Olds & Lowe, P.C.

(57) ABSTRACT

A fingerprint identifying module includes a sensing assembly, a cover and a metal ring. The cover has a protruding portion and the metal ring has an accommodation groove. The protruding portion of the cover is engaged with the accommodation groove of the metal ring so that the metal ring is bonded to the cover. Since no liquid glue is required for bonding the metal ring to the module, the step of baking and solidifying the liquid glue is saved and the manufacturing efficiency of the fingerprint identifying module is improved.

9 Claims, 5 Drawing Sheets

FINGERPRINT IDENTIFYING MODULE

FIELD OF THE INVENTION

The present invention relates to an identity identifying element, and particularly to a fingerprint identifying module identifying a user identity by using a fingerprint.

BACKGROUND OF THE INVENTION

In recent years, the fingerprint identifying technology is applied to various electronic products, so that a user may input an own fingerprint into an electronic product and make the electronic product save the fingerprint. Subsequently, the user may input the own fingerprint by using a fingerprint identifying module so as to unlock the electronic product. Unlocking the electronic product by using the fingerprint identifying technology is quicker and more convenient than previous unlocking manners by manually inputting a password, and therefore is liked by the user. Moreover, requirements for the fingerprint identifying module are also increased.

Subsequently, a structure of a conventional fingerprint identifying module is described. Please refer to FIG. 1, and FIG. 1 is an exploded schematic diagram of a structure of a conventional fingerprint identifying module. A conventional fingerprint identifying module 1 includes a fingerprint identifying and sensing element 10, a film coated layer 11, a circuit board 12, a metal ring 13, and a support board 14. The fingerprint identifying and sensing element 10 is provided on the circuit board 11 and is electrically connected thereto so as to obtain electric power. A function of the fingerprint identifying and sensing element 10 is sensing a finger of the user to obtain fingerprint information thereof. The film coated layer 11 is provided at an upper surface of the fingerprint identifying and sensing element 10 by using a coating technology, and functions thereof may be, in addition to protecting the fingerprint identifying and sensing element 10, further providing a color consistent with the electronic product, or a particular color which is required. The metal ring 13 is sleeved on the fingerprint identifying and sensing element 10, so as to transfer electric charges on the finger of the user or external electric charges, thereby avoiding occurrence of the electrostatic discharge (Electrostatic Discharge, ESD) effect. The support board 14 bears the foregoing various components and contacts the circuit board 12, so as to strengthen structural strength of the circuit board 12, thereby avoiding the circuit board 12 being damaged by an external force.

During a process of assembling the conventional fingerprint identifying module 1, after the fingerprint identifying and sensing element 10, the film coated layer 11, the circuit board 12, and the support board 14 are stacked, the metal ring 13 needs to be sleeved on the fingerprint identifying and sensing element 10. Bonding between the metal ring 13 and the support board 14 is achieved by providing a liquid glue on the support board 14, so as to adhere the metal ring 13 and the support board 14. After the metal ring 13 and the support board 14 are adhered, work of baking and solidification needs to be performed for a period of time (about 60 min) to solidify the liquid glue, so that the metal ring 13 and the support board 14 are really bonded. However, the work of baking and solidification requires too much time, and therefore, a manufacturing efficiency is reduced.

Therefore, a fingerprint identifying module which may improve the manufacturing efficiency is required.

SUMMARY OF THE INVENTION

An objective of the present invention is providing a fingerprint identifying module which may improve a manufacturing efficiency.

In a preferred embodiment, the present invention provides a fingerprint identifying module, including a sensing assembly, a cover, and a metal ring. The sensing assembly is configured to detect a fingerprint image of a finger. The cover is provided on the sensing assembly, and is configured to protect the sensing assembly, where the cover includes a protruding portion which is formed by the cover extending outward. The metal ring is sleeved on the cover and the sensing assembly, and is partially exposed outside the fingerprint identifying module. The metal ring includes an accommodation groove and a guide slope. The accommodation groove is provided on an inner side wall of the metal ring, and is configured to accommodate the protruding portion therein, so as to fix the cover on the metal ring. The guide slope is provided on the inner side wall of the metal ring, is close to the accommodation groove, and is configured to contact the protruding portion, so as to assist the protruding portion to move along the guide slope, thereby enabling the protruding portion to enter the accommodation groove.

Briefly, according to the fingerprint identifying module of the present invention, by providing the protruding portion on the cover, and providing the corresponding accommodation groove on the metal ring, the cover and the metal ring are bonded by using an engagement between the protruding portion and the accommodation groove. In another aspect, the cover is bonded with the sensing assembly, and the sensing assembly is bonded with the first support board. In other words, the metal ring contacts the first support board by using the cover and the sensing assembly, and the metal ring and the first support board need not to be directly bonded. In this way, a traditional practice of adhering the metal ring and the first support board by using liquid glue is replaced, so as to omit the work of baking and solidifying the liquid glue, thereby improving a manufacturing efficiency of the fingerprint identifying module.

DETAILED DESCRIPTION OF THE PREFERRED EMBODIMENT

The present invention provides a fingerprint identifying module which may resolve conventional technical problems.

Figure 1:
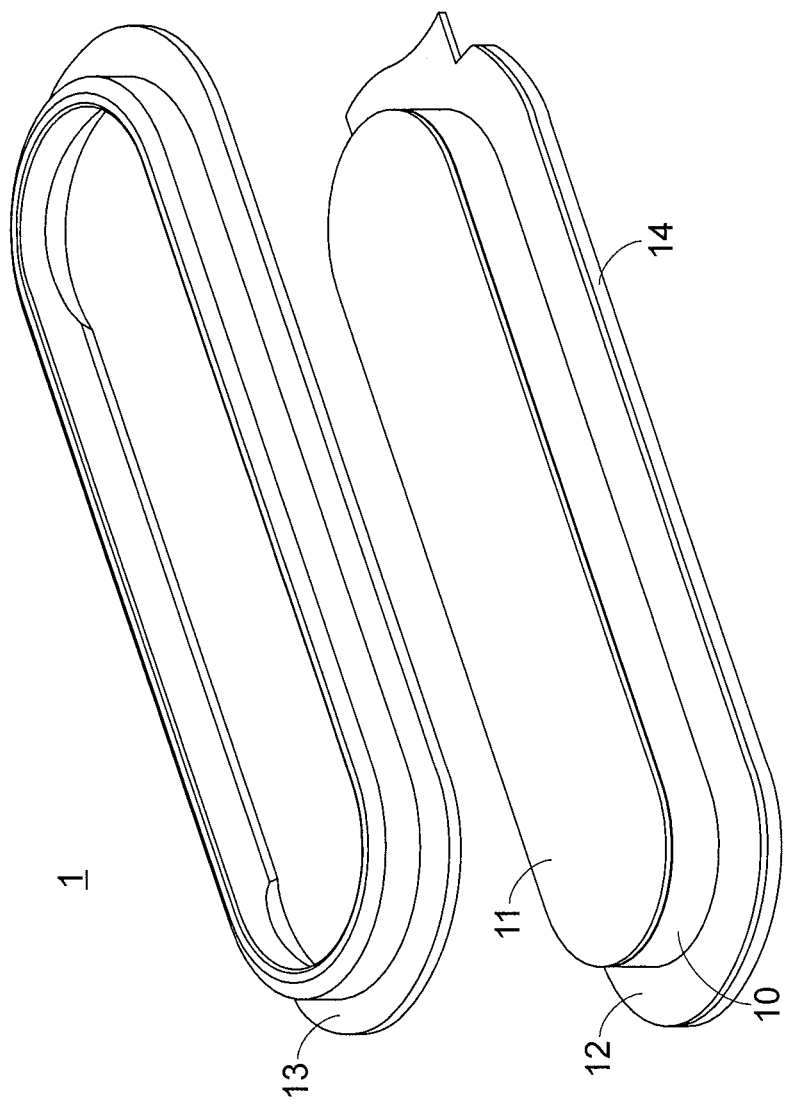
FIG. 1 is an exploded schematic diagram of a structure of a conventional fingerprint identifying module.
Figure 2:
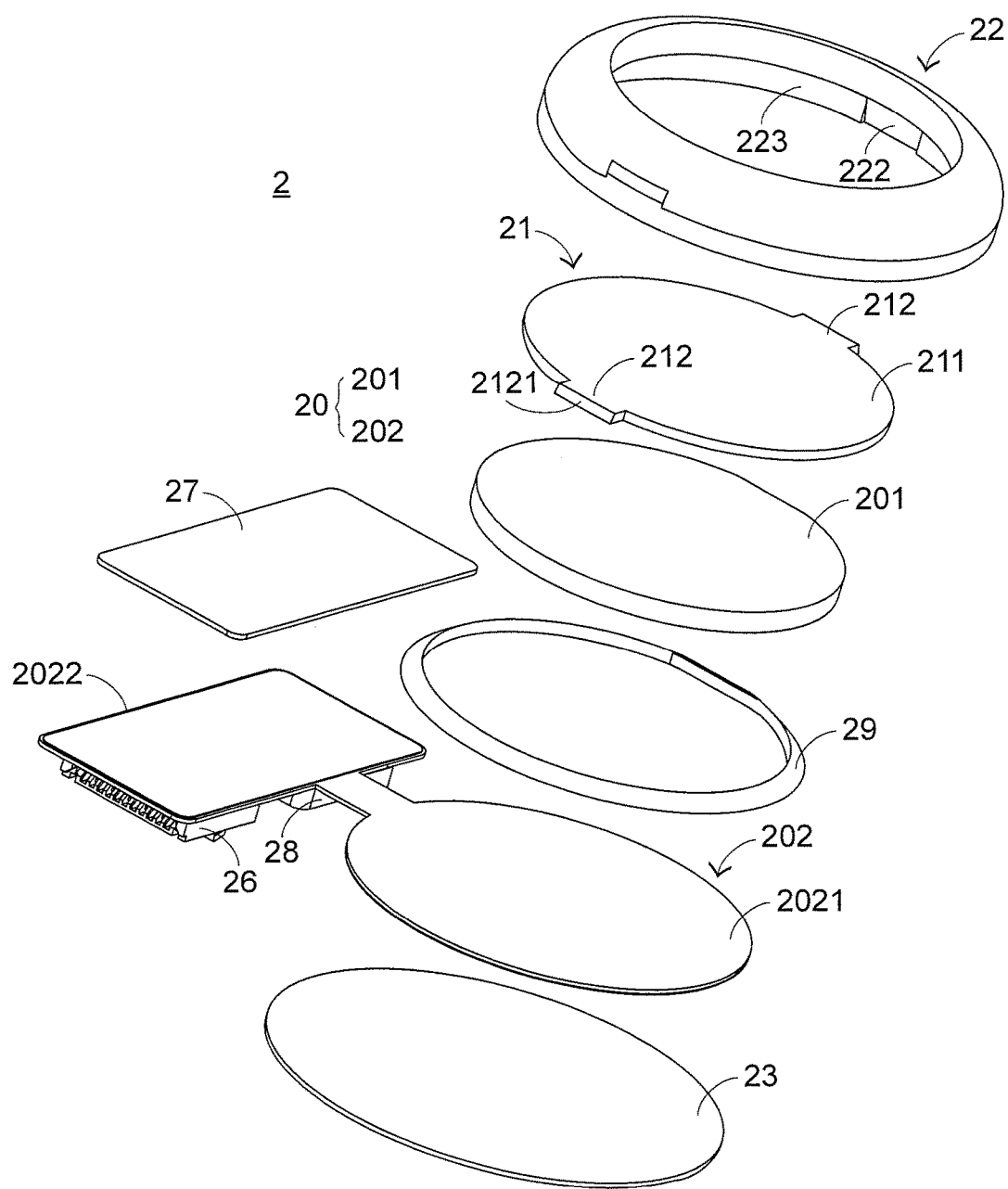
FIG. 2 is an exploded schematic diagram of a structure of a fingerprint identifying module of the present invention in a preferred embodiment.
Figure 3:
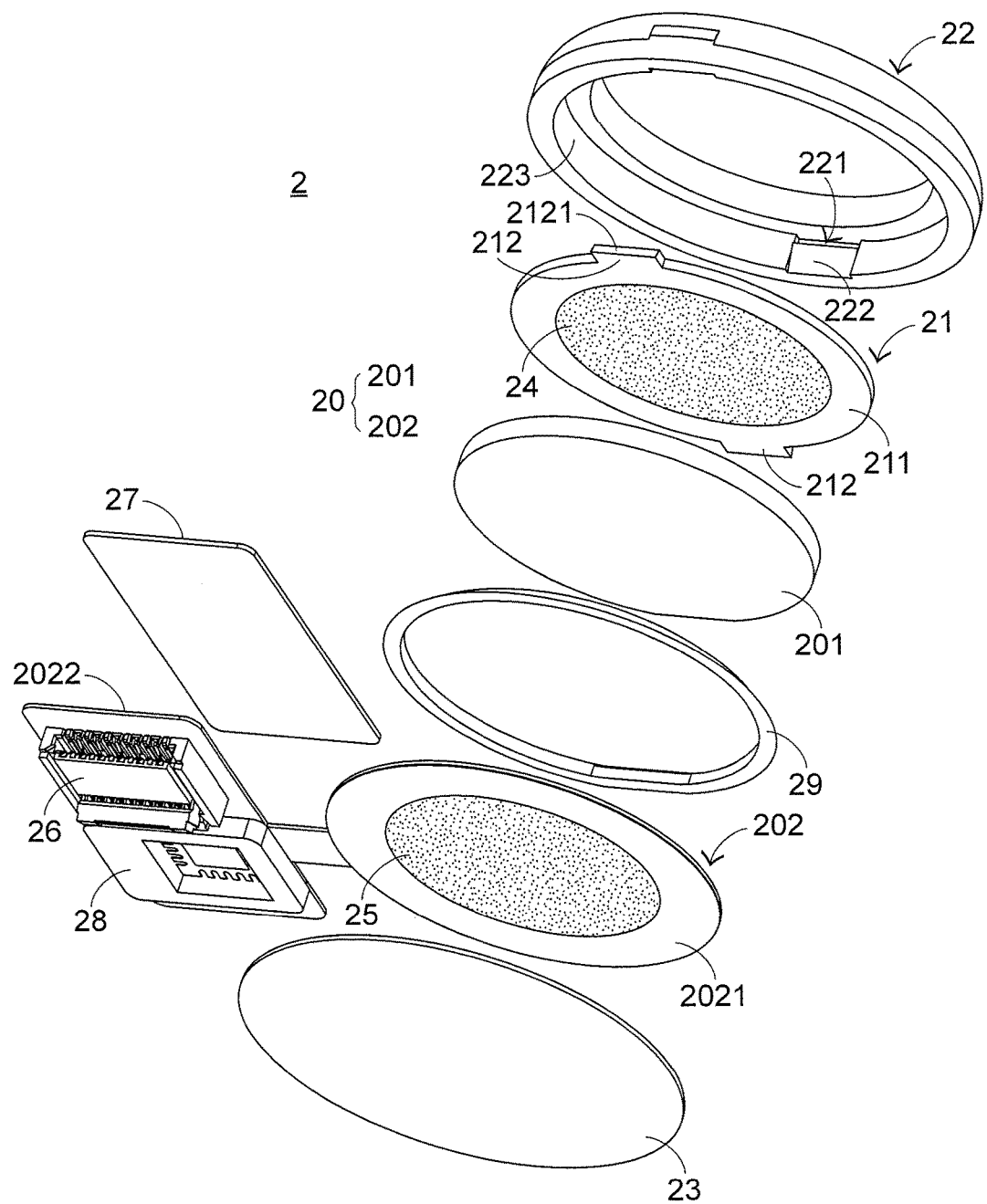
FIG. 3 is an exploded schematic diagram of a structure of a fingerprint identifying module of the present invention in a preferred embodiment from another angle of view.
Figure 4:
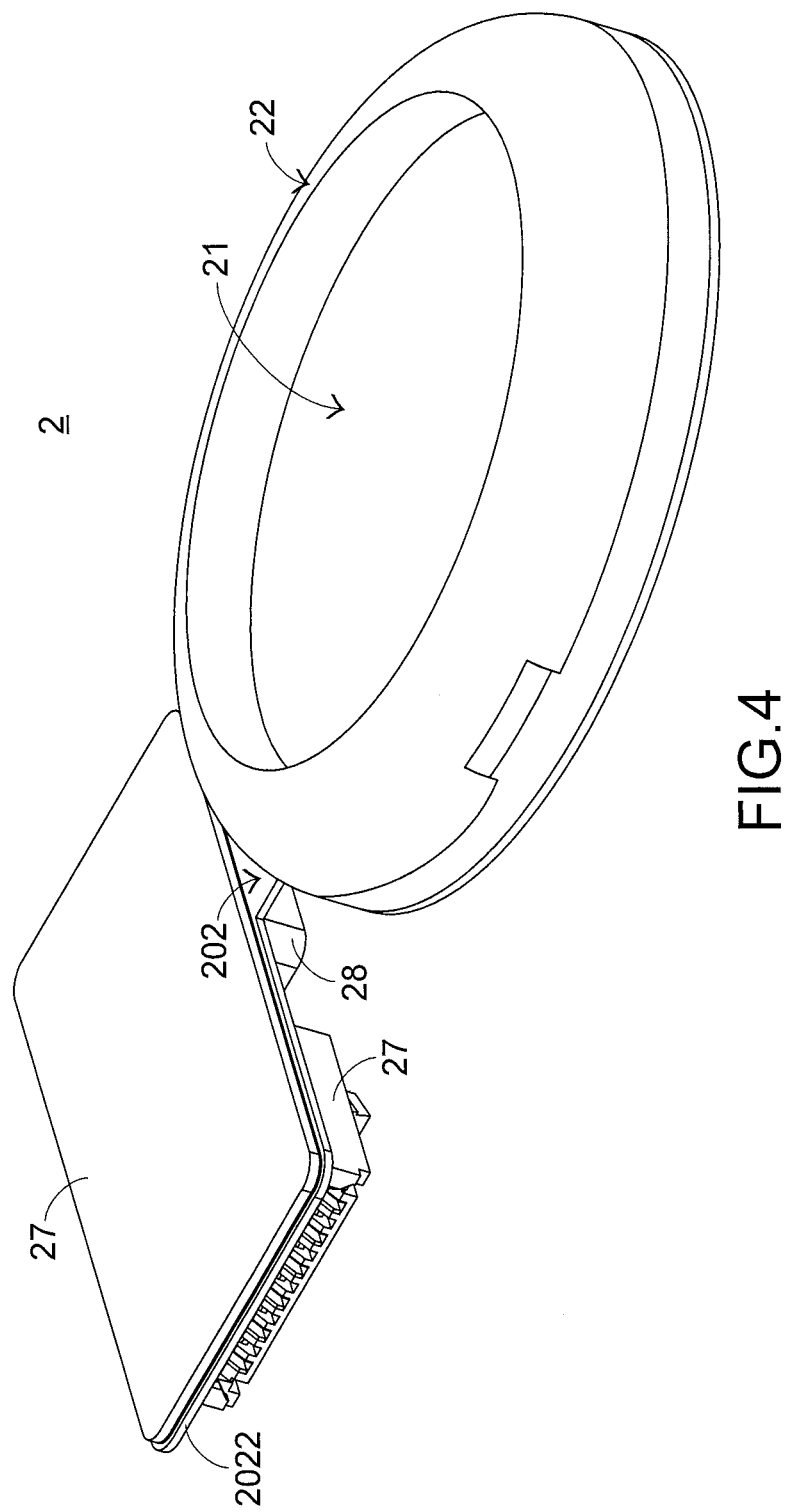
FIG. 4 is a schematic structural diagram of a fingerprint identifying module of the present invention in a preferred embodiment.

Please refer to FIG. 2, FIG. 3, and FIG. 4 at the same time. FIG. 2 is an exploded schematic diagram of a structure of a fingerprint identifying module in a preferred embodiment; FIG. 3 is an exploded schematic diagram of a structure of a fingerprint identifying module of the present invention in a preferred embodiment from another angle of view; and FIG. 4 is a schematic structural diagram of a fingerprint identifying module of the present invention in a preferred embodiment. FIG. 2 and FIG. 3 show various components of a fingerprint identifying module 2, including a sensing assembly 20, a cover 21, a metal ring 22, a first support board 23, a first adhesive layer 24, a second adhesive layer 25, a connector 26 (please refer to FIG. 4), a second support board 27, a electronic element 28, and a sealing element 29. A function of the sensing assembly 20 is detecting a fingerprint image of a finger (not shown in the figures) of a user. Moreover, the sensing assembly 20 includes a fingerprint identifying and sensing element 201 and a circuit board 202, where the fingerprint identifying and sensing element 201 is located below the cover 21 and connected to the cover 21, and may detect the fingerprint image of the finger. The circuit board 202 is located below the fingerprint identifying and sensing element 201 and is bonded with the fingerprint identifying and sensing element 201. The fingerprint identifying and sensing element 201 is bonded with the circuit board 202 by using a Surface Mount Technology (SMT). In this preferred embodiment, the fingerprint identifying and sensing element 201 is packed in a manner of land grid array (Land Grid Array, LGA) or ball grid array (Ball Grid Array, BGA); and the circuit board 202 may be selected as a flexible circuit board (FPC) or a rigid-flex board.

The cover 21 is provided on the sensing assembly 21, may protect the sensing assembly 21 and is bonded with the metal ring 22. The cover 21 includes a cover body 211 and a plurality of protruding portions 212, where the plurality of protruding portions 212 are respectively formed by the cover body 211 extending outward. In this preferred embodiment, the plurality of protruding portions 212 are integrally formed with the cover body 211, and the cover 21 is made of a glass material; this is merely for illustration purposes, but does not form a limitation. In another preferred embodiment, the cover may also be made of a ceramic material. In a preferred practice, the cover further includes an anti-fingerprint layer and a color layer. The anti-fingerprint layer is provided on an upper surface of the cover body, and may prevent fingerprint pattern of the finger from being adhered to the cover, so as to keep clean. In another aspect, it is not easy for the fingerprint pattern to remain on the anti-fingerprint layer. Therefore, the sensing assembly may correctly detect the fingerprint image of the finger, without being affected by the residual fingerprint pattern. The color layer is provided at a lower surface of the cover body, so that the cover body may display a required color, thereby achieving aesthetic effects.

In FIG. 2 and FIG. 3, the metal ring 22 is sleeved on the cover 21 and the sensing assembly 20, and is partially exposed outside the fingerprint identifying module 2. The metal ring 22 includes a plurality of accommodation grooves 221 and a guide slope 222, where each accommodation groove 221 corresponds to a protruding portion 212. The accommodation groove 221 is provided on an inner side wall 223 of the metal ring 22, and may accommodate the corresponding protruding portion 212 therein, so as to fix the cover 21 on the metal ring 22. The guide slope 222 may also be provided on the inner side wall 223 of the metal ring 22, closes to the plurality of accommodation grooves 221, and may contact the plurality of protruding portions 212, so as to assist the plurality of protruding portions 212 to move along the guide slope 222, thereby enabling the plurality of protruding portions 212 to enter the corresponding accommodation groove 221, respectively.

The circuit board 202 includes a first board body 2021 and a second board body 2022, where the second board body 2022 is formed by extending the first board body 2021. The first board body 2021 is electrically connected to the fingerprint identifying and sensing element 201, and contacts the first support board 23. The first support board 23 is located below the first board body 2021 of the circuit board 202 and is connected to the first board body 2021, and may bear the first board body 2021 thereon and strengthen a structure of the first board body 2021. The first adhesive layer 24 is provided on a lower surface of the cover 21 or an upper surface of the fingerprint identifying and sensing element 201, and may bond the cover 21 and the fingerprint identifying and sensing element 201. The second adhesive layer 25 is provided on a lower surface of the first board body 2021 or an upper surface of the first support board 23, and may bond the first board body 2021 and the first support board 23. In this preferred embodiment, the first adhesive layer 24 is a non-liquid double-sided tape, and the second adhesive layer 25 is an adhesive.

It should be particularly noted that, first, according to the present invention, the circuit board 202 is designed to have a two-piece shape, but is integrally formed, and internal lines are electrically connected to each other. The two-piece shape is merely for aesthetic purposes. Certainly, the circuit board may also uses a one-piece shape which integrates the first board body and the second board body as an integral. Second, the second adhesive layer may also use a conductive adhesive according to the actual requirements, so as to improve electrical conduction of the circuit board 202 and the first support board 23.

Figure 5:
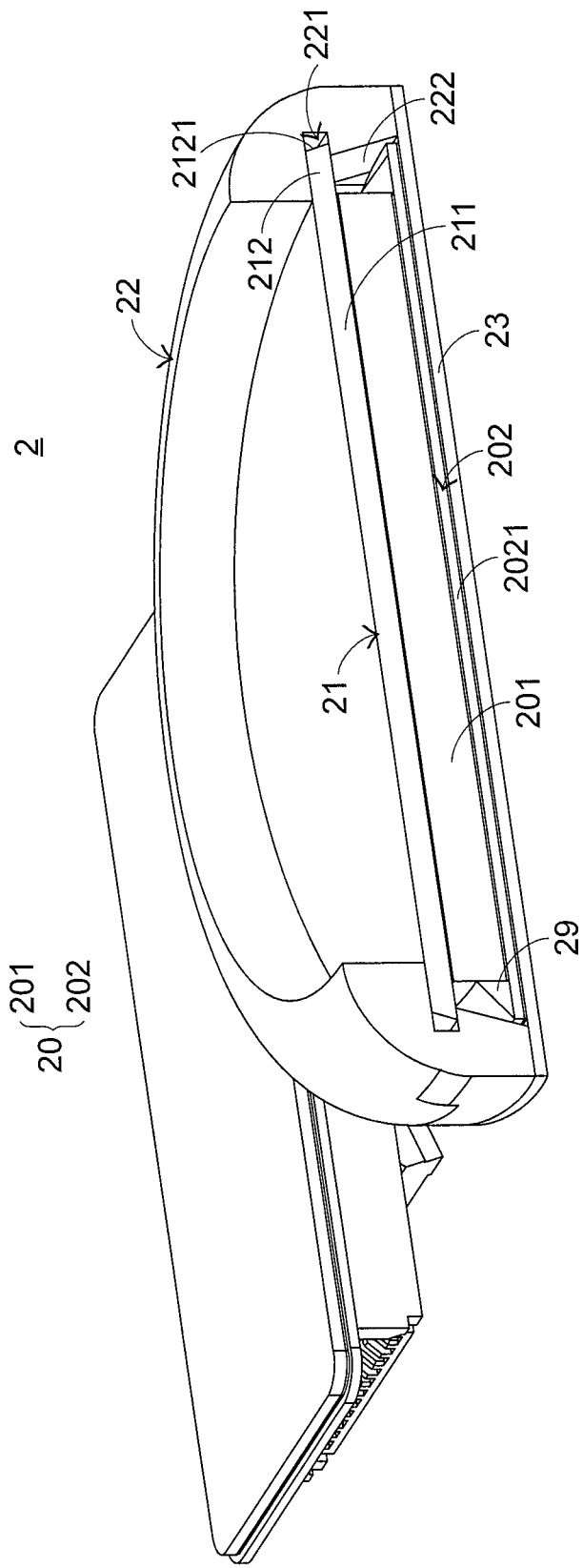
FIG. 5 is a sectional schematic diagram of a structure of a fingerprint identifying module of the present invention in a preferred embodiment.

The connector 26 is provided on a first surface of the second board body 2022, and a function thereof is electrically connecting the second board body 2022 and an external electronic element (not shown in the figures). The external electronic element is, for example, a connection portion of an electronic product which accommodates the fingerprint identifying module 2, so as to establish an electric connection between the fingerprint identifying module 2 and the electronic product. The second support board 27 is provided on a second surface of the second board body 202, that is, provided at a back surface of the connector 26. The second support board 27 may strengthen a structure of the second board body 2022, so as to firm a configuration of the connector 26. A plurality of electronic assemblies 28 are provided on the second board body 2022, and may generate a particular function. The sealing element 29 is provided on the first board body 2021 of the circuit board 202, and surrounds the fingerprint identifying and sensing element 201, as shown in FIG. 5. A function of the sealing element 29 is avoiding a foreign object (for example, an external liquid or external dusts) entering between the fingerprint identifying and sensing element 201 and the circuit board 202. In this preferred embodiment, the plurality of electronic assemblies 28 may use a capacitor, a diode, or a processor, and the sealing element 29 is a sealant. The fingerprint identifying module 2 is formed by combining various components, and combination states are shown in FIG. 4 and FIG. 5.

In FIG. 5, during a process of bonding the metal ring 22 and the cover 21, the plurality of protruding portions 212 contact the guide slope 222 and move along the guide slope 222. In this way, the plurality of protruding portions 212 may respectively enter the corresponding accommodation groove 221, thereby enabling the cover 21 to be engaged with the accommodation groove 221 by using the plurality of protruding portions 212, as shown in FIG. 5. In this preferred embodiment, a side edge 2121 of the protruding portion 212 is a slope complementary to the guide slope 222. It should be particularly noted that the side edge 2121 of the protruding portion 212 is designed as a slope structure; this helps the protruding portion 212 to contact the guide slope 222 and move along the guide slope 222, so as to facilitate an assembly of the metal ring 22 and the cover 21. Certainly, the fingerprint identifying module of the present invention does not limit the side edge 2121 of the protruding portion 212 to be designed as a slope structure, and may also design the side edge of the protruding portion as a planar structure.

It can be known from the above that, according to the fingerprint identifying module of the present invention, by providing the protruding portion on the cover and providing the corresponding accommodation groove on the metal ring, the cover and the metal ring are bonded by using an engagement between the protruding portion and the accommodation groove. In another aspect, the cover is bonded with the sensing assembly, and the sensing assembly is bonded with the first support board. In other words, the metal ring contacts the first support board by using the cover and the sensing assembly, and the metal ring and the first support board need not to be directly bonded. In this way, a traditional practice of adhering the metal ring and the first support board by using a liquid glue is replaced, so as to omit the work of baking and solidifying the liquid glue, thereby improving a manufacturing efficiency of the fingerprint identifying module. The foregoing is merely the preferred embodiments of the present invention, and is not intended to limit the scope of the present invention. Therefore, any other equivalent replacement or modification made without departing from the spirit disclosed by the present invention shall fall within the scope of the present invention.

What is claimed is:

1. A fingerprint identifying module, comprising:
   a sensing assembly, configured to detect a fingerprint image of a finger, wherein the sensing assembly comprises:
      a fingerprint identifying and sensing element, located below a cover and connected to the cover, and configured to detect the fingerprint image of the finger; and
      a circuit board, located below the fingerprint identifying and sensing element and bonded with the fingerprint identifying and sensing element;
   the cover, provided on the sensing assembly, and configured to protect the sensing assembly, wherein the cover comprises a protruding portion which is formed by the cover extending outward;
   a metal ring, sleeved on the cover and the sensing assembly, and partially exposed outside the fingerprint identifying module, wherein the metal ring comprises:
      an accommodation groove, provided on an inner side wall of the metal ring, and configured to accommodate the protruding portion therein, so as to fix the cover on the metal ring; and
      a guide slope, provided on the inner side wall of the metal ring, closing to the accommodation groove, and configured to contact the protruding portion, so as to assist the protruding portion to move along the guide slope, thereby enabling the protruding portion to enter the accommodation groove;
   a first support board, located below the circuit board and connected to the circuit board, and configured to bear the circuit board thereon and strengthen a structure of the circuit board; and
   a first adhesive layer, provided on the cover or the fingerprint identifying and sensing element, and configured to bond the cover and the fingerprint identifying and sensing element.

2. The fingerprint identifying module according to claim 1, wherein a side edge of the protruding portion contacts the guide slope, and a shape of the side edge of the protruding portion is complementary to the guide slope.

3. The fingerprint identifying module according to claim 1, wherein the fingerprint identifying and sensing element is bonded with the circuit board by using a Surface Mount Technology (SMT).

4. The fingerprint identifying module according to claim 1, wherein the circuit board comprises:
   a first board body, electrically connected to the fingerprint identifying and sensing element, and contacting the first support board; and
   a second board body, formed by extending the first board body.

5. The fingerprint identifying module according to claim 4, further comprising a second adhesive layer which is provided on the first board body or the first support board, and is configured to bond the circuit board and the first support board.

6. The fingerprint identifying module according to claim 5, the second adhesive layer is an adhesive or a conductive adhesive.

7. The fingerprint identifying module according to claim 4, further comprising:
   a connector, provided on a first surface of the second board body, and configured to electrically connect the second board body and an external electronic element;
   a second support board, provided on a second surface of the second board body, and configured to strengthen a structure of the second board body; and
   an electronic element, provided on the first surface of the second board body.

8. The fingerprint identifying module according to claim 1, further comprising a sealing element which is provided on the circuit board and surrounds the fingerprint identifying and sensing element, and is configured to avoid a foreign object entering between the fingerprint identifying and sensing element and the circuit board.

9. A fingerprint identifying module, comprising:
   a sensing assembly, configured to detect a fingerprint image of a finger;
   a cover, provided on the sensing assembly, and configured to protect the sensing assembly, wherein the cover comprises a protruding portion which is formed by the cover extending outward; and
   a metal ring, sleeved on the cover and the sensing assembly, and partially exposed outside the fingerprint identifying module,
   wherein the metal ring comprises:
      an accommodation groove, provided on an inner side wall of the metal ring, and configured to accommodate the protruding portion therein, so as to fix the cover on the metal ring; and
      a guide slope, provided on the inner side wall of the metal ring, closing to the accommodation groove, and configured to contact the protruding portion, so as to assist the protruding portion to move along the guide slope, thereby enabling the protruding portion to enter the accommodation groove; and wherein a side edge of the protruding portion contacts the guide slope, and a shape of the side edge of the protruding portion is complementary to the guide slope.

* * * * *